(12) United States Patent
Kasahara

(10) Patent No.: US 8,189,064 B2
(45) Date of Patent: May 29, 2012

(54) IMAGING APPARATUS

(75) Inventor: Ryosuke Kasahara, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 358 days.

(21) Appl. No.: 12/457,417

(22) Filed: Jun. 10, 2009

(65) Prior Publication Data

US 2010/0002105 A1 Jan. 7, 2010

(30) Foreign Application Priority Data

Jul. 4, 2008 (JP) ................................. 2008-176193

(51) Int. Cl.
*H04N 5/228* (2006.01)

(52) U.S. Cl. ..................................... 348/222.1

(58) Field of Classification Search ......................... None
See application file for complete search history.

(56) References Cited

U.S. PATENT DOCUMENTS

| | | | |
|---|---|---|---|
| 5,276,519 A | 1/1994 | Richards et al. | |
| 7,245,319 B1* | 7/2007 | Enomoto | 348/222.1 |
| 7,321,685 B2 | 1/2008 | Okada et al. | |
| 2003/0031375 A1* | 2/2003 | Enomoto | 382/255 |
| 2004/0150732 A1* | 8/2004 | Yamanaka | 348/272 |
| 2004/0202380 A1 | 10/2004 | Kohler et al. | |
| 2004/0247201 A1* | 12/2004 | Arazaki | 382/275 |
| 2005/0053307 A1* | 3/2005 | Nose et al. | 382/275 |
| 2005/0069218 A1* | 3/2005 | Chen | 382/274 |
| 2006/0188172 A1* | 8/2006 | Higurashi et al. | 382/275 |
| 2007/0046804 A1* | 3/2007 | Hirano et al. | 348/333.01 |
| 2007/0103564 A1* | 5/2007 | Chiba | 348/223.1 |
| 2007/0126892 A1* | 6/2007 | Guan | 348/240.99 |
| 2007/0146497 A1* | 6/2007 | Yamamoto | 348/222.1 |
| 2007/0165119 A1* | 7/2007 | Ikeda | 348/246 |
| 2008/0007630 A1* | 1/2008 | Hara | 348/223.1 |
| 2008/0291312 A1* | 11/2008 | Egawa | 348/308 |

FOREIGN PATENT DOCUMENTS

| | | |
|---|---|---|
| CN | 1543226 A | 11/2004 |
| EP | 1 761 072 | 3/2007 |
| JP | 10-224695 A * | 8/1998 |
| JP | 2006-345053 | 12/2006 |
| JP | 2006-345054 | 12/2006 |
| JP | 2006-345055 | 12/2006 |
| JP | 2006-345056 | 12/2006 |

OTHER PUBLICATIONS

JP-10-224695 Machine Translations.*
Oi, Ryutaro, et al. "P1.2: Pixel Based Random Access Image Sensor Array for Real-time IBR." 2002 IEEE, pp. 134-139.
European Search Report dated Dec. 17, 2010, in corresponding European Patent Application No. 09251559.2.
Chinese Office Action dated Sep. 13, 2010 for corresponding Application No. 200910149876.1.

* cited by examiner

*Primary Examiner* — Sinh Tran
*Assistant Examiner* — Jason Flohre
(74) *Attorney, Agent, or Firm* — Harness, Dickey & Pierce, PLC

(57) ABSTRACT

An imaging device includes a color filter having a predetermined color array and converts an optical image into image data of an electrical signal. A coordinate transforming unit transforms a first coordinate value of the imaging device into a second coordinate value in a state of the color array according to a color of the color filter corresponding to the first coordinate value. The imaging device reads out a pixel value of a pixel at the second coordinate value as a pixel value of a pixel at the first coordinate value by setting the first coordinate value as a coordinate transform destination and the second coordinate value as a coordinate transform source.

17 Claims, 10 Drawing Sheets

G-SIGNAL　　R-SIGNAL　　B-SIGNAL

| | 162 | | 164 | | 166 | |
|---|---|---|---|---|---|---|
| RGB PIXEL DATA → | CONVERTING UNIT | Y-SIGNAL → | FIR FILTER | Y-SIGNAL → | INVERSE CONVERTING UNIT | → RGB PIXEL DATA |

CbCr-SIGNAL

| 0 | −0.5 | 0 | −0.5 | 0 |
|---|---|---|---|---|
| −0.5 | 0 | −1.0 | 0 | −0.5 |
| 0 | −1.0 | 9.0 | −1.0 | 0 |
| −0.5 | 0 | −1.0 | 0 | −0.5 |
| 0 | −0.5 | 0 | −0.5 | 0 |

FIR FILTER

FIG. 6A

|   | 0 | 1 | 2 | 3 | 4 | 5 |
|---|---|---|---|---|---|---|
| 0 | G | B | G | B | G | B |
| 1 | R | G | R | G | R | G |
| 2 | G | B | G | B | G | B |
| 3 | R | G | R | G | R | G |
| 4 | G | B | G | B | G | B |
| 5 | R | G | R | G | R | G |

BAYER ARRAY BEFORE COORDINATE TRANSFORMATION

FIG. 6B

|   | 0 | 1 | 2 | 3 | 4 | 5 |
|---|---|---|---|---|---|---|
| 0 | G | B | G | B | G | B |
| 1 | R | G | R | G | R | G |
| 2 | G | B | G | B | G | B |
| 3 | R | G | R | G | R | G |
| 4 | G | B | G | B | G | B |
| 5 | R | G | R | G | R | G |

BAYER ARRAY AFTER COORDINATE TRANSFORMATION

|   | 0 | 1 | 2 | 3 | 4 | 5 |
|---|---|---|---|---|---|---|
| 0 | G (0) | B (1) | G (0) | B (1) | G (0) | B (1) |
| 1 | R (2) | G (3) | R (2) | G (3) | R (2) | G (3) |
| 2 | G (0) | B (1) | G (0) | B (1) | G (0) | B (1) |
| 3 | R (2) | G (3) | R (2) | G (3) | R (2) | G (3) |
| 4 | G (0) | B (1) | G (0) | B (1) | G (0) | B (1) |
| 5 | R (2) | G (3) | R (2) | G (3) | R (2) | G (3) |

FIG. 10A
1
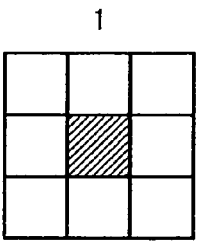
X1=rX
Y1=rY
FIG. 10B
2
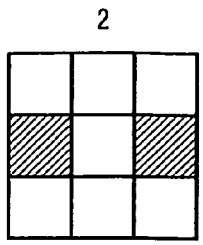
WHEN dX>0,
X2=rX+1
OTHERWISE,
X2=rX−1,
Y2=rY
FIG. 10C
3
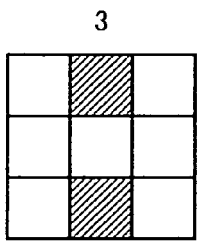
X3=rX
WHEN dY>0,
Y3=rY+1
OTHERWISE,
Y3=rY−1
FIG. 10D
4
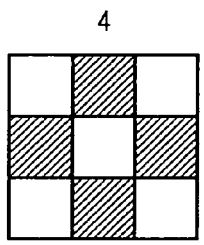
WHEN dX>0,
X4=rX+1
OTHERWISE,
X4=rX−1,
Y4=rY
FIG. 10E
5
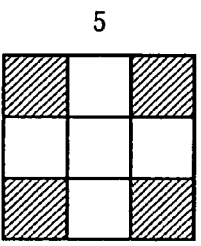
WHEN dX>0,
X5=rX+1
OTHERWISE,
X5=rX−1,
WHEN dY>0,
Y5=rY+1
OTHERWISE,
Y5=rY−1
FIG. 11
| ARRAY VALUE | SET OF X, Y IN OUTPUT |
|---|---|
| 0 | R → 3<br>G → 1<br>B → 2 |
| 1 | R → 5<br>G → 4<br>B → 1 |
| 2 | R → 1<br>G → 4<br>B → 5 |
| 3 | R → 2<br>G → 1<br>B → 3 |

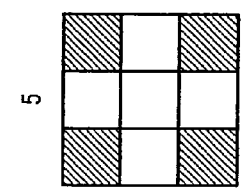
FIG. 13A
1
X1=rX
Y1=rY
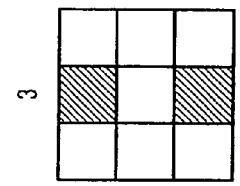
FIG. 13B
2
X2=rX-1
Y2=rY
FIG. 13C
3
X3=rX
Y3=rY-1
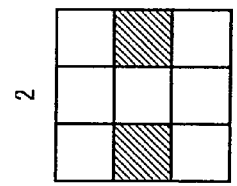
FIG. 13D
4
X4=rX-1
Y4=rY
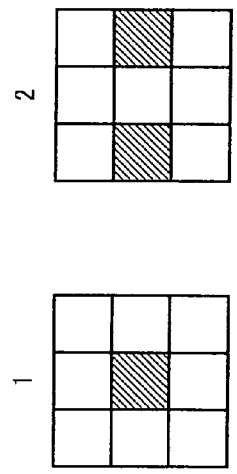
FIG. 13E
5
X5=rX-1
WHEN dY>0,
Y5=rY+1
OTHERWISE,
Y5=rY-1
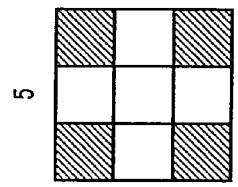
FIG. 14A
1
X1=rX
Y1=rY
d1=0
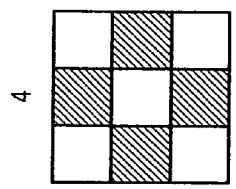
FIG. 14B
2
X2=rX+1
Y2=rY
d2=dX+0.5
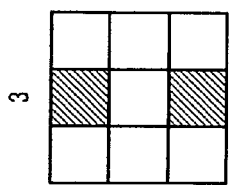
FIG. 14C
3
X3=rX
Y3=rY+1
d3=dY+0.5
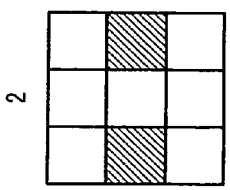
FIG. 14D
4
X4=rX+1
Y4=rY
d4=dX+0.5
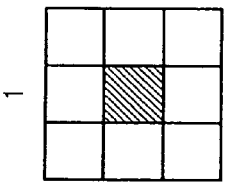
FIG. 14E
5
X5=rX+1
WHEN dY>0,
Y5=rY+1
OTHERWISE,
Y5=rY-1
d5=dX+0.5

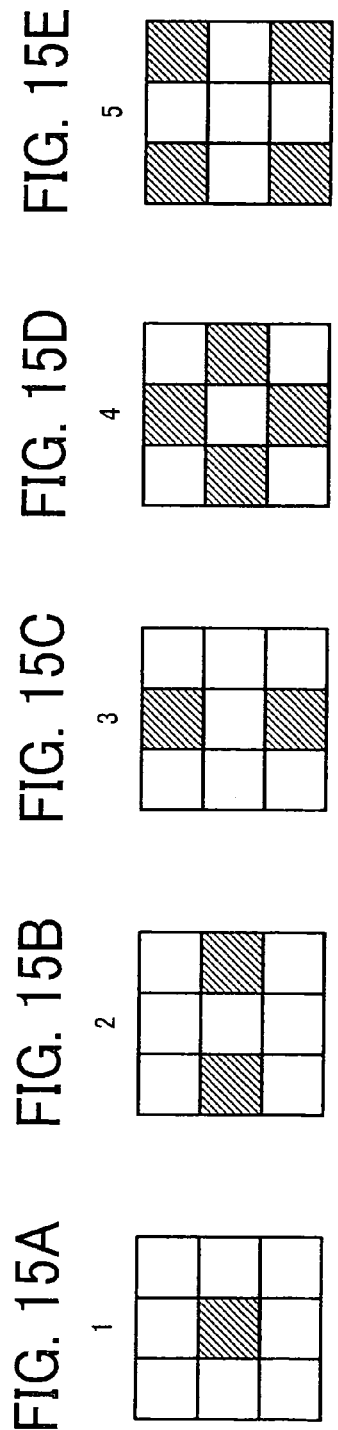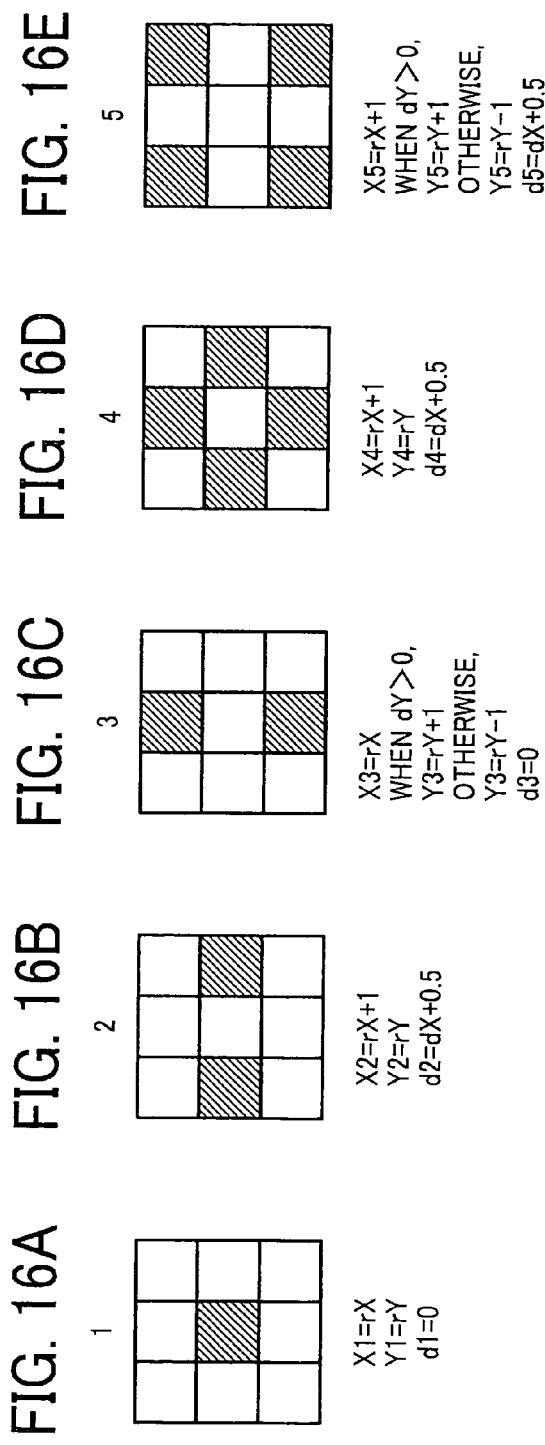

IMAGING APPARATUS

CROSS-REFERENCE TO RELATED APPLICATIONS

The present application claims priority to and incorporates by reference the entire contents of Japanese priority document 2008-176193 filed in Japan on Jul. 4, 2008.

BACKGROUND OF THE INVENTION

1. Field of the Invention

The present invention relates to an imaging apparatus that obtains an image captured by an optical system having a wide angle and a large magnification chromatic aberration and distortion, and, more particularly to a technology for correcting a magnification chromatic aberration and distortion of an obtained image.

2. Description of the Related Art

Recently, demands for a wide-angle small imaging apparatus have been increasing for an application such as a back monitor of a vehicle. However, it is difficult to design a small optical system with a small magnification chromatic aberration and distortion, and performance needs to be improved in combination with image processing. In this case, coordinate transform has been conventionally performed in a subsequent stage for image data obtained by an imaging device such as a charge coupled device (CCD) and a complimentary metal oxide semiconductor (CMOS) sensor to correct the magnification chromatic aberration and distortion.

FIG. 17 is a configuration diagram of a conventional imaging apparatus of this type. In FIG. 17, an imaging device 1 is a CCD or CMOS sensor, and converts an optical image captured through an optical system having a wide angle and a large magnification chromatic aberration and distortion (not shown) into an electrical signal (image data). A counter 2 generates a coordinate value (x, y), which is a frame address, based on a clock and a horizontal/vertical synchronization signal (not shown) provided from outside. The image data is sequentially read from the imaging device 1 based on the coordinate value (x, y) of the counter 2 and sequentially written in a frame memory 3. The frame memory 3 can be a line buffer for a predetermined number of lines. Meanwhile, a coordinate transforming unit 4 inputs the coordinate value (x, y) of the counter 2 to calculate a transformed coordinate for correcting the magnification chromatic aberration and distortion according to a predetermined formula of coordinate transform, and sequentially reads the image data from the frame memory 3 by using the transformed coordinate value (x, y). Accordingly, magnification chromatic aberration-corrected and distortion-corrected image data is read from the frame memory 3.

For example, in Japanese Patent Application Laid-open No. 2006-345054 are described a method of correcting a magnification chromatic aberration and distortion simultaneously, by performing coordinate transform independently for each of RGB color components in R (red), G (green), and B (blue) signals obtained by an imaging device such as a CCD or CMOS sensor in a subsequent stage, and a method of correcting only distortion by performing coordinate transform for respective RGB color components at the same time, ignoring magnification chromatic aberration.

In the conventional technique, a large-capacity frame memory or line buffer has been required separately to realize coordinate transform for correcting the magnification chromatic aberration and distortion. Particularly when the magnification chromatic aberration and distortion are corrected simultaneously by independently performing coordinate transform for each RGB color component, a memory capable of addressing independently for each RGB color component is required, and it is necessary to use an expensive 3-port random access memory (RAM) (for example, a static RAM (SRAM)) having a 3-chip configuration or to drive a RAM in a time-sharing manner. Further, when only the distortion is corrected by performing coordinate transform commonly to the RGB color components, although a low-cost dynamic RAM (DRAM) or the like having a 1-chip configuration can be used, a memory is still required separately.

Generally, a color filter such as of a Bayer array is provided in the imaging device. In the conventional technique, after a defective pixel due to a color filter array such as the Bayer array is interpolated, the magnification chromatic aberration and distortion are corrected with respect to a signal obtained by the imaging device, and thus a large-capacity frame memory or line buffer is required separately.

SUMMARY OF THE INVENTION

It is an object of the present invention to at least partially solve the problems in the conventional technology.

According to one aspect of the present invention, there is provided an imaging apparatus including an imaging device including a color filter having a predetermined color array, the imaging device converting an optical image obtained through an optical system into image data of an electrical signal; and a coordinate transforming unit that transforms a first coordinate value of the imaging device into a second coordinate value in a state of the color array according to a color of the color filter corresponding to the first coordinate value. The imaging device reads out a pixel value of a pixel at the second coordinate value as a pixel value of a pixel at the first coordinate value taking the first coordinate value as a coordinate transform destination and the second coordinate value as a coordinate transform source.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 6A and 6B are schematic diagrams for explaining the principle of correction of magnification chromatic aberration of the present invention;

FIGS. 10A to 10E depict a content of calculation performed by a coordinate correcting unit shown in FIGS. 6A and 6B;

FIG. 11 depicts an operation by the array determining unit;

FIGS. 13A to 13E depict a content of calculation performed by a coordinate correcting unit A shown in FIG. 12;

FIGS. 14A to 14E depict a content of calculation performed by a coordinate correcting unit B shown in FIG. 12;

FIGS. 15A to 15E depict a content of calculation performed by a coordinate correcting unit A of the coordinate transforming unit according to a third example of the present invention;

FIGS. 16A to 16E depict a content of calculation in a coordinate correcting unit B of the magnification-chromatic-aberration correcting unit according to the third example.

DETAILED DESCRIPTION OF THE PREFERRED EMBODIMENTS

Exemplary embodiments of the present invention will be explained in detail below with reference to the accompanying drawings.

Figure 1:
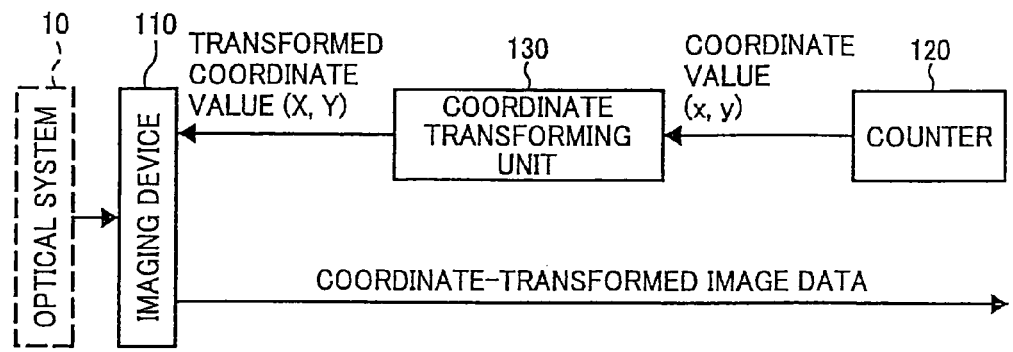
FIG. 1 is a basic block diagram of an imaging apparatus according to the present invention.

FIG. 1 is a basic configuration diagram of an imaging apparatus of the present invention. In FIG. 1, an imaging device 110 includes a CMOS color sensor or the like capable of random access, and converts an optical image captured using an optical system 10 having a wide angle and a large magnification chromatic aberration and distortion into an electrical signal (image data). The imaging device 110 includes a color filter of a predetermined color array such as the Bayer array. A counter 120 generates an original coordinate value (x, y) of the imaging device 110 based on a clock and a horizontal/vertical synchronization signal (not shown) provided from outside. A coordinate transforming unit 130 receives the coordinate value (x, y) of the counter 120 to sequentially calculate a coordinate value (X, Y) of a coordinate transform source for correcting at least one of the magnification chromatic aberration and distortion according to a predetermined formula of coordinate transform, in the state of the predetermined color array, taking into consideration the color of the color filter corresponding to the coordinate value (x, y), and provides the coordinate value (X, Y) to the imaging device 110. The imaging device 110 sequentially reads a pixel value of the pixel at the coordinate (X, Y) as a pixel value of the pixel at the coordinate (x, y), using the coordinate value (X, Y) as a read address.

When the center of a screen is assumed as the origin, the formula of coordinate transform can be expressed, for example, as:

$$X=x+[a(1)+a(2)\times abs(x)+a(3)\times abs(y)+a(4)\times y^2]\times x$$

$$Y=y+[b(1)+b(2)\times abs(y)+b(3)\times abs(x)+b(4)\times x^2]\times y \quad (1)$$

where abs( ) denotes an absolute value, a(1) to a(4) and b(1) to b(4) denote coordinate transform coefficients. The coordinate transform coefficients can be held beforehand in a table or the like.

With the configuration shown in FIG. 1, the image data in which one of the magnification chromatic aberration and distortion or both thereof are corrected in the state of the predetermined color array can be read directly from the imaging device 110, and the frame memory or line buffer for coordinate transform is not required separately.

In FIG. 1, the counter 120 and the coordinate transforming unit 130 can be built in the imaging device 110.

One embodiment of the imaging apparatus of the present invention is explained in detail below. In this embodiment, it is assumed that the imaging device includes a color filter of the Bayer array; however, the present invention is also applicable to an imaging device including another color filter such as a CMYG array or RGB+Ir (infrared) array. While color components of the image are red (R), green (G), and blue (B) as additive primary colors, they can be yellow (Y), magenta (M), and cyan (C) as subtractive primary colors.

In the conventional technique, correction of a magnification chromatic aberration has been performed for a signal obtained by an imaging device after interpolating a defective pixel due to a predetermined color array such as the Bayer array. However, to correspond to an optical system having a large magnification chromatic aberration, a quite large memory capacity is required for the magnification chromatic aberration (for coordinate transform), and the device becomes very expensive. Further, because the magnification chromatic aberration is different for each color component, a memory capable of addressing independently for each color component is required for correction of the magnification chromatic aberration, and it is necessary to use the expensive 3-port random access memory (RAM) (for example, a static RAM (SRAM)) having the 3-chip configuration or to drive a RAM in a time-sharing manner, which makes the device even more expensive.

In the embodiment explained below, image data in which the magnification chromatic aberration is corrected in the state of the Bayer array is read directly from the imaging device, and the defective pixel due to the Bayer array is interpolated for the magnification chromatic aberration-corrected and Bayer-arrayed image data. Thereafter, modulation transfer function (MTF) correction, distortion correction, and gamma correction are performed.

Figure 2:
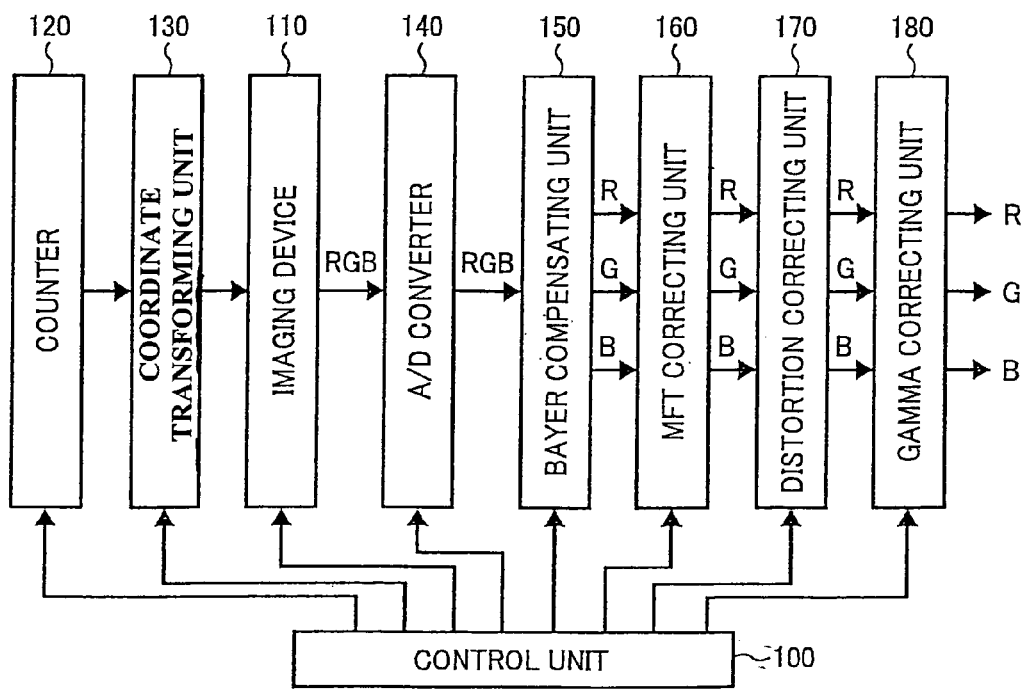
FIG. 2 is an entire block diagram of an imaging apparatus according to an embodiment of the present invention.

FIG. 2 is a functional block diagram in an imaging apparatus according to an embodiment of the present invention. In addition to the components shown in FIG. 2, the imaging apparatus according to the embodiment includes an operating unit, an image storage unit, and an image display unit, which are not shown in FIG. 2. The imaging apparatus is used as, for example, a vehicle on-board camera, but it is not the only application that limits the present invention.

As shown in FIG. 2, a control unit 100 provides required control signals (clock, horizontal/vertical synchronization signal, and the like) to respective units to control the operation of the units in a pipelined manner.

The imaging device 110 includes, for example, a CMOS sensor for converting the optical image captured using the optical system (not shown) having a wide angle and a large magnification chromatic aberration and distortion into an electrical signal (image signal), and has a random access mechanism. A Bayer color filter array is provided in the imaging device 110.

The counter 120 generates a coordinate value (x, y) based on a clock and a horizontal/vertical synchronization signal provided from the control unit 100, and provides the coordinate value to the coordinate transforming unit 130 as the coordinate transforming unit. Although not shown in FIG. 2, the coordinate value (x, y) generated by the counter 120 is given also to the subsequent stage sequentially by shifting a predetermined time.

The coordinate transforming unit 130 receives the coordinate value (x, y) output from the counter 120 to sequentially calculate a transformed coordinate for correcting the magnification chromatic aberration according to a predetermined formula of coordinate transform such as Formula (1), and outputs the transformed coordinate value (X,Y). The imaging device 110 sequentially reads a pixel value of a pixel at the coordinate value (X,Y) using the coordinate value (X,Y) as a read address. That is, the magnification chromatic aberration-corrected and Bayer-arrayed RGB image signal is directly read from the imaging device 110.

In a simple coordinate transform, the Bayer array changes before and after the coordinate transform, and Bayer interpolation cannot be correctly performed by a Bayer compensating unit 150 in the subsequent stage. That is, the Bayer array needs to be maintained before and after the coordinate transform. Therefore, the coordinate transforming unit 130 maintains the coordinate of the coordinate transform source when the color of the Bayer array of the source is the same as that of the coordinate transform destination, while the coordinate transforming unit 130 changes the coordinate of the source to a coordinate of the same color as that of the destination closest to the coordinate of the source, for example, when the color of the Bayer array of the source is not the same as that of the destination. Accordingly, even if the magnification chromatic aberration is corrected in the Bayer-arrayed RGB image, the Bayer array can be maintained. The coordinate transforming unit 130 will be explained later in detail.

As described above, the counter 120 and the coordinate transforming unit 130 can be built in the imaging device 110 such as the CMOS sensor.

An analog-to-digital (A/D) converter 140 converts the magnification chromatic aberration-corrected and Bayer-arrayed RGB image signal as an analog signal output from the imaging device 110 into a digital signal (image data) and transmits the digital signal. For example, the image data includes 8 bits for each of RGB. The A/D converter 140 can be built in the imaging device 110 together with the counter 120 and the coordinate transforming unit 130.

The Bayer compensating unit 150 receives the magnification chromatic aberration-corrected RGB image data of the Bayer array, generates image data (pixel data) at all coordinate positions by linear interpolation for each color of RGB, and outputs the pixel data to an MTF correcting unit 160.

Figures 3A, 3B, 3C, 4, 5:
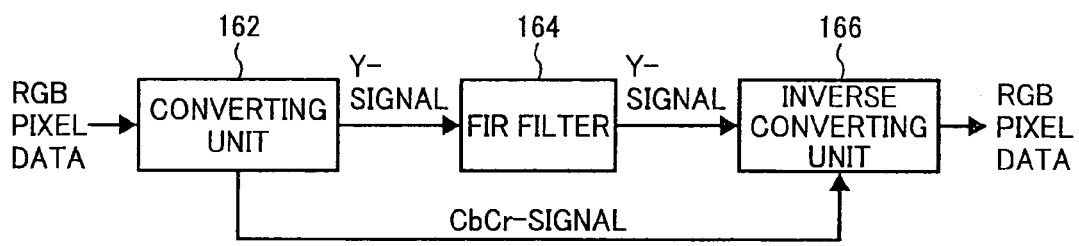
FIGS. 3A to 3C depict a color filter with Bayer array.
FIG. 4 is a configuration diagram of an example of an MTF correcting unit.
FIG. 5 is an example a finite impulse response (FIR) filter.

FIGS. 3A to 3C are examples of a color filter with Bayer array. For convenience' sake, R, G, B are separated and shown in FIGS. 3A to 3C; however in practice, RGB are integrally arrayed (Bayer-arrayed), where $G_0$ is obtained by Equations (2) to (7).

$$G_0=(G_2+G_4+G_6+G_8)/4 \quad (2)$$

$$R_2=(R_1+R_3)/2 \quad (3)$$

$$R_4=(R_3+R_5)/2 \quad (4)$$

$$R_6=(R_5+R_7)/2 \quad (5)$$

$$R_8=(R_1+R_7)/2 \quad (6)$$

$$R_0=(R_1+R_3+R_5+R_7)/4 \quad (7)$$

$B_2$, $B_4$, $B_6$, $B_8$, and $B_0$ are the same as the case of $R_2$, $R_4$, $R_6$, $R_8$, and $R_0$.

The MTF correcting unit 160 receives each of the magnification chromatic aberration-corrected and Bayer-interpolated RGB image data to perform MTF correction by using an FIR filter and outputs the respective MTF-corrected RGB image data.

FIG. 4 is a block diagram of the MTF correcting unit 160. A converting unit 162 converts RGB image data into YCbCr image data based on Equations (8) to (10).

$$Y=0.299R+0.587G+0.114B \quad (8)$$

$$Cr=0.500R-0.419G-0.081B \quad (9)$$

$$Cb=-0.169R-0.332G+0.500B \quad (10)$$

An FIR filter (5×5 filter) 164 receives only a luminance signal Y of YCbCr, and performs predetermined MTF correction. A high quality image with amplification of color noise being suppressed can be obtained by filtering (performing MTF correction) only to the Y-signal. FIG. 5 is a schematic diagram for illustrating an example of the FIR filter. Because the Y-signal is filtered, the MTF correction needs to be performed after the correction of the chromatic aberration of magnification. However, when the MTF correction is performed after the distortion correction, the transform distance in the coordinate transform is large in the distortion correction and an arithmetic error easily occurs, as described below. The MTF correction is preferably performed at a subsequent stage of correction of the chromatic aberration of magnification and at a previous stage of the distortion correction as in the present embodiment, to avoid that the error is amplified by the MTF correction to adversely affect the image quality.

An inverse converting unit 166 receives the CbCr-signal and the MTF-corrected Y-signal, and outputs inverse-converted RGB image data based on Equations (11) to (13).

$$R=Y+1.402Cr \quad (11)$$

$$G=Y-0.714Cr-0.344Cb \quad (12)$$

$$B=Y+1.772Cb \quad (13)$$

A distortion correcting unit 170 receives the chromatic aberration of magnification-corrected and MTF-corrected RGB image data, performs the coordinate transform (distortion coordinate transform) commonly to the respective color components of RGB according to a predetermined equation, and outputs the distortion-corrected RGB image data. Although the distortion is large, the distortion is uniform for respective color components of RGB. Therefore, although a large memory capacity is required for the coordinate transform in the distortion correcting unit 170, a 1-port memory can be used, and therefore a high-latency memory (DRAM) can be used.

A gamma correcting unit 180 receives the RGB image data output from the distortion correcting unit 170, performs predetermined gamma correction by using respective lookup tables or the like of RGB, and outputs the gamma-corrected RGB image data.

With the configuration as shown in FIG. 2, the imaging device itself functions as the frame memory or line buffer (RAM), and thus the RAM for coordinate transform is not required separately. Therefore, the apparatus can be produced at a lower cost and in a smaller size. Generally, the coordinate transform needs to be performed after interpolating a defective color of the color filter, and thus the imaging device cannot be used as the RAM for the coordinate transform. The configuration shown in FIG. 2 is realized by the embodiment in which the coordinate transform can be performed in the state of the color filter array of the imaging device.

The coordinate transforming unit 130, which is a major component in the embodiment, is explained below in detail.

First, a principle enabling correction of a magnification chromatic aberration by performing coordinate transform in the state of the Bayer array is explained with reference to FIGS. 6A and 6B. FIG. 6A depicts the Bayer array before coordinate transform, and FIG. 6B depicts the Bayer array after coordinate transform. In FIGS. 6A and 6B, the Bayer array has simply 6×6 pixels. However, a resolution Video Graphics Array (VGA) has 640×640 pixels, for example, in which the Bayer array in FIGS. 6A and 6B is repeated.

The magnification chromatic aberration shows a different shift for each color component of RGB; however, because the magnitude of the magnification chromatic aberration can be seen based on design data of the optical system, it can be calculated to which position each color component of RGB shifts. In FIG. 6A, it is assumed that a pixel (G) at a position of coordinate (0, 0) is shifted to a position of coordinate (1, 1), and likewise, a pixel (B) at a position of coordinate (1, 0) is shifted to a position of coordinate (3, 1). Correction of the magnification chromatic aberration is basically realized by copying pixel values of pixels at coordinates (1, 1) and (3, 1) to original positions of coordinates (0, 0) and (1, 0), that is, by performing coordinate transform. Coordinates (1, 1) and (3, 1) are referred to as a coordinate (X, Y) of a source, and coordinates (0, 0) and (1, 0) are referred to as a coordinate (x, y) of a destination. When a coordinate value is referred to, (x, y) and (X, Y) are referred to as coordinate values, so that the coordinate and the coordinate value are used as appropriate according to need.

As described above, when the coordinate transform is simply performed with respect to the Bayer-arrayed RGB image data, the Bayer array changes before and after the coordinate transform, and Bayer interpolation cannot be performed correctly at the subsequent stage. Therefore, when the color of the source is the same as that of the destination, the pixel value of the pixel of the source is directly copied to the destination. When the color of the source is different from that of the destination, the coordinate of the source is corrected to a coordinate of the same color as that of the destination and closest to the coordinate of the source, and a pixel value of the pixel at the corrected coordinate is copied to the destination.

In FIG. 6A, the color of the destination at coordinate (0, 0) and the color of the source at coordinate (1, 1) are both green (G). In this case, the pixel value of the pixel (G) at coordinate (1, 1) of the source is directly set as the pixel value of the pixel at coordinate (0, 0) of the destination. On the other hand, the source at coordinate (1, 0) is blue (B) whereas the destination at coordinate (3, 1) is green (G). In this case, the source is corrected to a coordinate of the same color, blue (B), as that of coordinate (1, 0) of the destination and closest to coordinate (3, 1) (in FIG. 6A, coordinate (3, 2)), and the pixel value of the pixel (B) at the corrected coordinate (3, 2) is set as the pixel value of the pixel at coordinate (1, 0) of the destination. Accordingly, as shown in FIG. 6B, the Bayer array after the coordinate transform is maintained in the Bayer array before the coordinate transform in FIG. 6A. Three examples are shown below as a specific configuration of the coordinate transforming unit 130.

Figure 7:
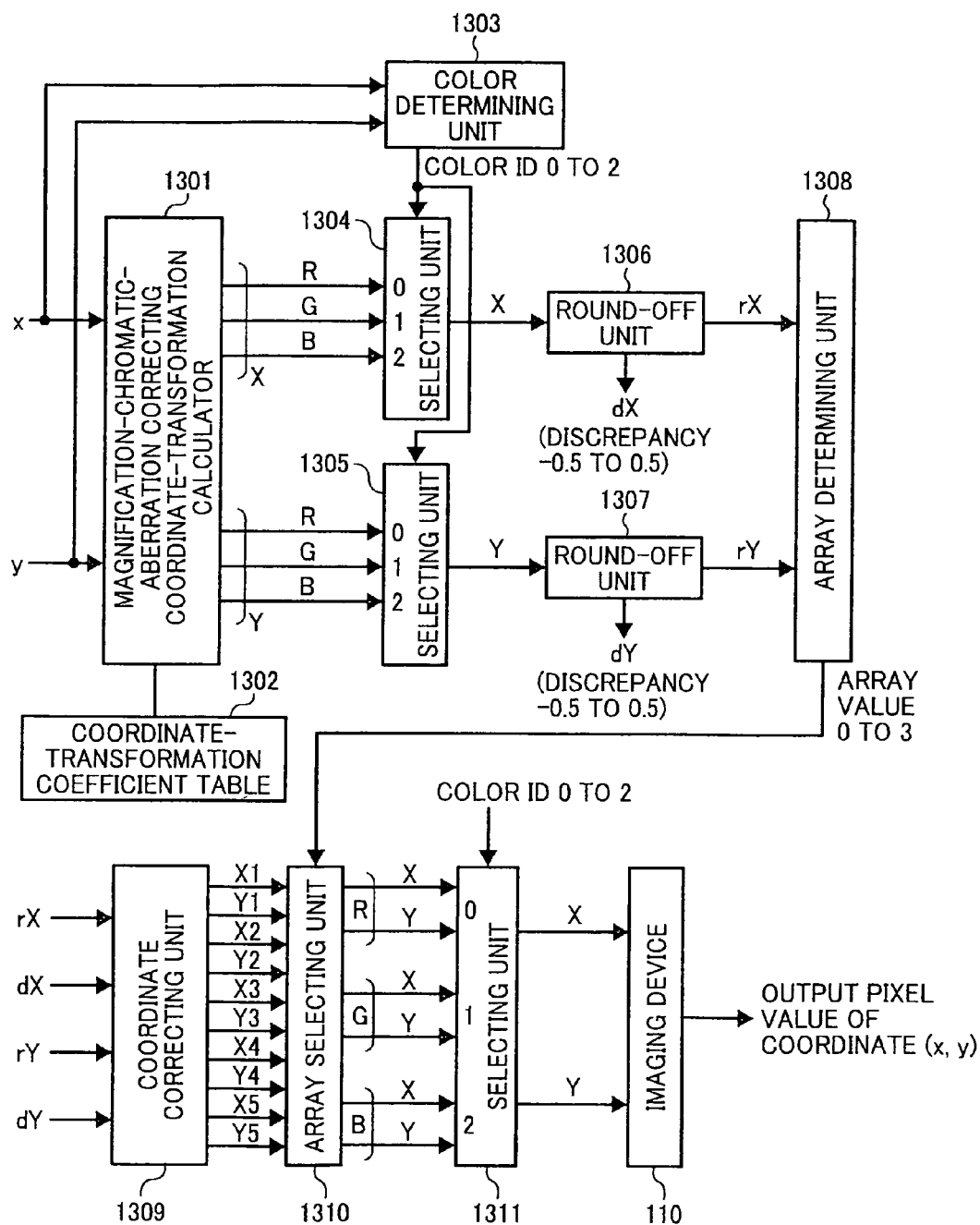
FIG. 7 is an overall configuration diagram of a coordinate transforming unit shown in FIG. 2 according to a first example of the present invention.

FIG. 7 is an overall configuration diagram of the coordinate transforming unit 130 according to a first example. As explained by FIGS. 6A and 6B, when the color of the source coordinate is the same as that of the destination coordinate, the pixel value of the pixel of the source coordinate is set as the pixel value of the pixel of the destination coordinate; however, when the color of the source coordinate is different from that of the destination coordinate, a pixel value of a pixel at a coordinate of the same color as that of the destination coordinate closest to the source coordinate is set as the pixel value of the pixel of the destination coordinate.

In FIG. 7, the coordinate value (X, Y) of the source with respect to the coordinate value (x, y) of the destination is generated by a magnification chromatic-aberration correcting coordinate-transform calculator 1301, a coordinate-transform coefficient table 1302, a color determining unit 1303, selecting units 1304 and 1305, round-off units 1306 and 1307, an array determining unit 1308, a coordinate correcting unit 1309, an array selecting unit 1310, and a selecting unit 1311. The magnification chromatic aberration-corrected and Bayer-arrayed RGB image data is sequentially read from the imaging device 110 based on the coordinate value (X, Y) output from the selecting unit 1311. That is, the pixel value of the pixel at the coordinate (X, Y) of the imaging device 110 is read as the pixel value of the pixel at the coordinate (x, y). As described later, when the Bayer array color of the coordinate (X, Y) is different from that of the coordinate (x, y), the coordinate (X, Y) is corrected to a coordinate of the same color as that of the coordinate (x, y) closest to the coordinate (X, Y). Therefore, the Bayer array of the RGB image data output from the imaging device 110 is maintained. The configuration of FIG. 7 is explained below in more detail.

The magnification chromatic-aberration correcting coordinate-transform calculator 1301 receives the coordinate value (x, y) of the destination, to calculate the coordinate value X, Y of the source corresponding to RGB according to the predetermined formula of coordinate transform such as Formula (1), and transmits the calculated coordinate value to the selecting units 1304 and 1305. The coordinate transform coefficients are held beforehand in the coordinate-transform coefficient table 1302.

The color determining unit 1303 receives the coordinate value (x, y), and obtains a color identification (ID) corresponding to the color of the coordinate (x, y) of the destination focused in the Bayer array according to a lookup table (LUT) or the like. For example, the color ID is stored beforehand in the LUT, designating the coordinate value (x, y) as an address. The color ID is assumed here as R=0, G=1, and B=2.

Figures 8, 9:
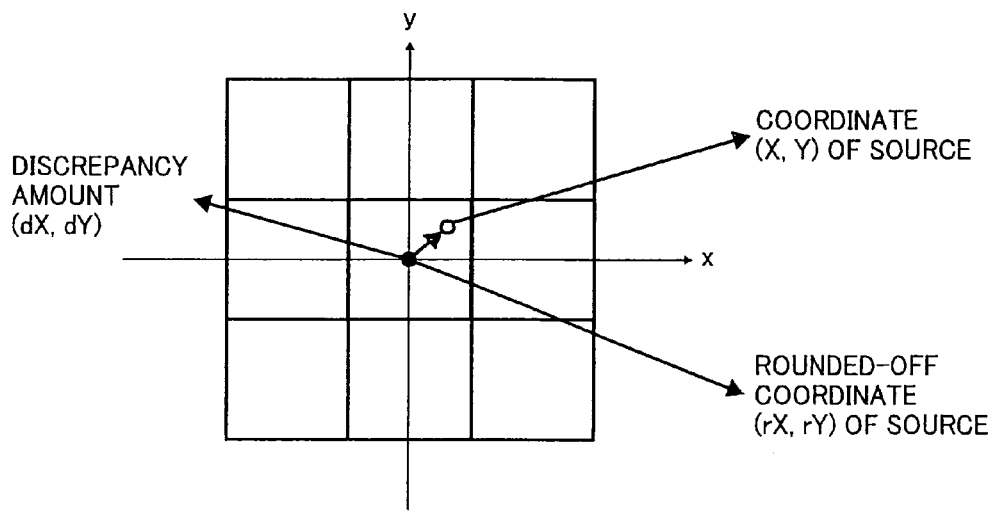
FIG. 8 depicts a relation between a coordinate value of a source, a coordinate value obtained by rounding off the coordinate value, and discrepancies between those.
FIG. 9 is a schematic diagram for explaining an operation by an array determining unit shown in FIGS. 6A and 6B.

The selecting units 1304 and 1305 select a coordinate value X, Y of one color from the coordinate values X, Y of the source corresponding to RGB calculated by the magnification-chromatic-aberration correcting coordinate-transform calculator 1301 based on the color ID obtained by the color determining unit 1303. The coordinate value X, Y is not limited to an integer. The round-off units 1306 and 1307 round off the coordinate value X, Y selected by the selecting units 1304 and 1305 (to the whole number), and output the integer of the coordinate value rX, rY of the source corresponding to the pixel. Simultaneously, the round-off units 1306 and 1307 output respective discrepancies (differences) dX, dY between X and rX, and Y and rY, where dX and dY take a value of from −0.5 to 0.5. FIG. 8 depicts a relation between the coordinate value X, Y of the source obtained by the calculation, the coordinate value rX, rY obtained by rounding off the coordinate value X, Y, and the discrepancies dX, dY between those. One square surrounded by a frame in FIG. 8 depicts one pixel.

The array determining unit 1308 receives rX, rY and obtains an array value of the focused coordinate (rX, rY) of the source in the Bayer array according to the lookup table. An example of the array value in the Bayer array in FIGS. 6A and 6B is shown in FIG. 9. In FIG. 9, a numerical value described in brackets in each pixel indicates the array value. It is assumed here that the array value is 0 to 3, however, any number can be used so long as the array can be identified.

On the other hand, the coordinate correcting unit 1309 receives rX, rY, dX, and dY and corrects rX and rY according to the values of dX and dY. That is, the coordinate correcting unit 1309 calculates the coordinate value of the source after the correction. The coordinate correcting unit 1309 calculates the coordinate value of the source after the correction, respectively, for all types of array patterns of the same color that can be obtained in the Bayer array.

FIGS. 10A to 10E depict a content of the calculation performed by the coordinate correcting unit 1309. One square surrounded by the frame in FIGS. 10A to 10E indicates a pixel as in FIG. 8. In the Bayer array, the array pattern of the same color is classified into five of 1 to 5 in FIGS. 10A to 10E. The square in the middle of the 3×3 square is the focused source to be corrected. As shown in FIG. 8, the coordinate rX and rY corresponds to a central position of the middle square. The coordinate correcting unit 1309 corrects rX and rY according to dX and dY for respective patterns 1 to 5 in FIGS. 10A to 10E. Specifically, the coordinate correcting unit 1309 performs calculation according to (a) to (e) written below the patterns 1 to 5 in FIGS. 10A to 10E, and outputs X1 and Y1, X2 and Y2, X3 and Y3, X4 and Y4, and X5 and Y5, respectively. That is, the coordinate after the correction indicates any one of shaded squares for respective patterns in FIGS. 10A to 10E.

In FIGS. 10A to 10E, pattern 1 is applied to a case that the destination and the source are the same color. On the other hand, patterns 2 to 5 are applied to a case that the destination and the source are different colors. Pattern 1 is applied to any colors of RGB. Patterns 2, 3, and 5 are applied to a case that the color of the source is R or B, and pattern 4 is applied to a case that the color of the source is G.

The array selecting unit 1310 receives X1, Y2, X2, Y2, X3, Y3, X4, Y4, X5, and Y5, and selects the coordinate value X, Y of the source after the correction of respective colors of R, G, and B based on the array value obtained by the array determining unit 1308. FIG. 11 depicts correspondence between the array value and X, Y. For example, when the array value is 0, a set of X3 and Y3 in pattern 3 is designated as X, Y for R, a set of X1 and Y1 in pattern 1 is designated as X, Y for G, and a set of X2 and Y2 in pattern 2 is designated as X, Y for B. The same applies when the array value is 1, 2, or 3.

The selecting unit 1311 receives a set of X, Y of respective colors of R, G, and B, selects a set of X, Y of the same color as that of the destination based on the color ID obtained by the color determining unit 1303, and transmits the set to the imaging device 110. As a result, the imaging device 110 reads the pixel value of the pixel at the coordinate (X, Y) as the pixel value of the pixel at the coordinate (x, y). Because the coordinate (X, Y) and the coordinate (x, y) are maintained in the same color, the Bayer array does not change before and after the coordinate transform.

A specific example of the processing is explained with reference to FIGS. 6A and 6B. A case that the coordinate (x, y) of the destination is (0, 0) and the coordinate (X, Y) of the source is (1, 1) is explained. In this case, the color determining unit 1303 outputs G(1) as the color ID. The magnification-chromatic-aberration correcting coordinate-transform calculator 1301 calculates (X, Y) for RGB, respectively, by inputting the coordinate (0, 0), and the selecting units 1304 and 1305 output (X, Y) of G. The round-off units 1306 and 1307 round off (X, Y), and output (1, 1) as (rX, rY). The array determining unit 1308 outputs 3 as the array value based on FIG. 9. The individual calculation performed by the coordinate correcting unit 1309 is omitted here. The array selecting unit 1310 selects (X2, Y2) as (X, Y) for R, (X1, Y1) as (X, Y) for G, and (X3, Y3) as (X, Y) for B based on FIG. 11. The selecting unit 1311 selects (X1, Y1) of (X, Y) for G, because the color ID is G(1). According to FIGS. 10A to 10E, (X1, Y1)=(rX, rY), and ultimately the coordinate (1, 1) of the source directly becomes an output from the selecting unit 1311. The imaging device 110 reads the pixel value of the pixel at coordinate (1, 1) as the pixel value of the pixel at coordinate (0, 0).

A case that the coordinate (x, y) of the destination is (1, 0) and the coordinate (X, Y) of the source is (3, 1) is explained next. In this case, the color determining unit 1303 outputs (B(2)) as the color ID. The magnification-chromatic-aberration correcting coordinate-transform calculator 1301 calculates (X, Y) for RGB, respectively, by inputting the coordinate (1, 0), and the selecting units 1304 and 1305 output (X, Y) of B. The round-off units 1306 and 1307 round off (X, Y), and output (3, 1) as (rX, rY). Further, it is assumed that the round-off units 1306 and 1307 output dX=0, dY=+0.2 as the discrepancies dX, dY. The array determining unit 1308 outputs 3 as the array value based on FIG. 9. The individual calculation performed by the coordinate correcting unit 1309 is omitted here. The array selecting unit 1310 selects (X2, Y2) as (X, Y) for R, (X1, Y1) as (X, Y) for G, and (X3, Y3) as (X, Y) for B based on FIG. 11. The selecting unit 1311 selects (X3, Y3) of (X, Y) for B, because the color ID is B(2). According to FIGS. 10A to 10E, (X3, Y3) is such that X3=rX, but Y3=rY+1 in the case of dY>0, otherwise, Y3=rY−1. Because dY=+0.2, (X3, Y3)=(rX, rY+1), and ultimately the output from the selecting unit 1311 becomes (3, 2). The imaging device 110 reads the pixel value of the pixel at coordinate (3, 2) as the pixel value of the pixel at coordinate (1, 0).

According to the configuration of FIG. 7, when the color of the coordinate of the source is the same as that of the destination, the coordinate of the source is left as it is, and when the color is different from each other, the coordinate of the source can be corrected to a coordinate of the same color as that of the destination and closest to the coordinate of the source. As a result, even if correction of magnification chromatic aberration is performed directly with respect to the Bayer-arrayed RGB image data, the Bayer array can be maintained before and after the coordinate transform. Further, because the magnification chromatic aberration-corrected image data is directly read from the imaging device 110, the coordinate transform memory is not required.

Figure 12:
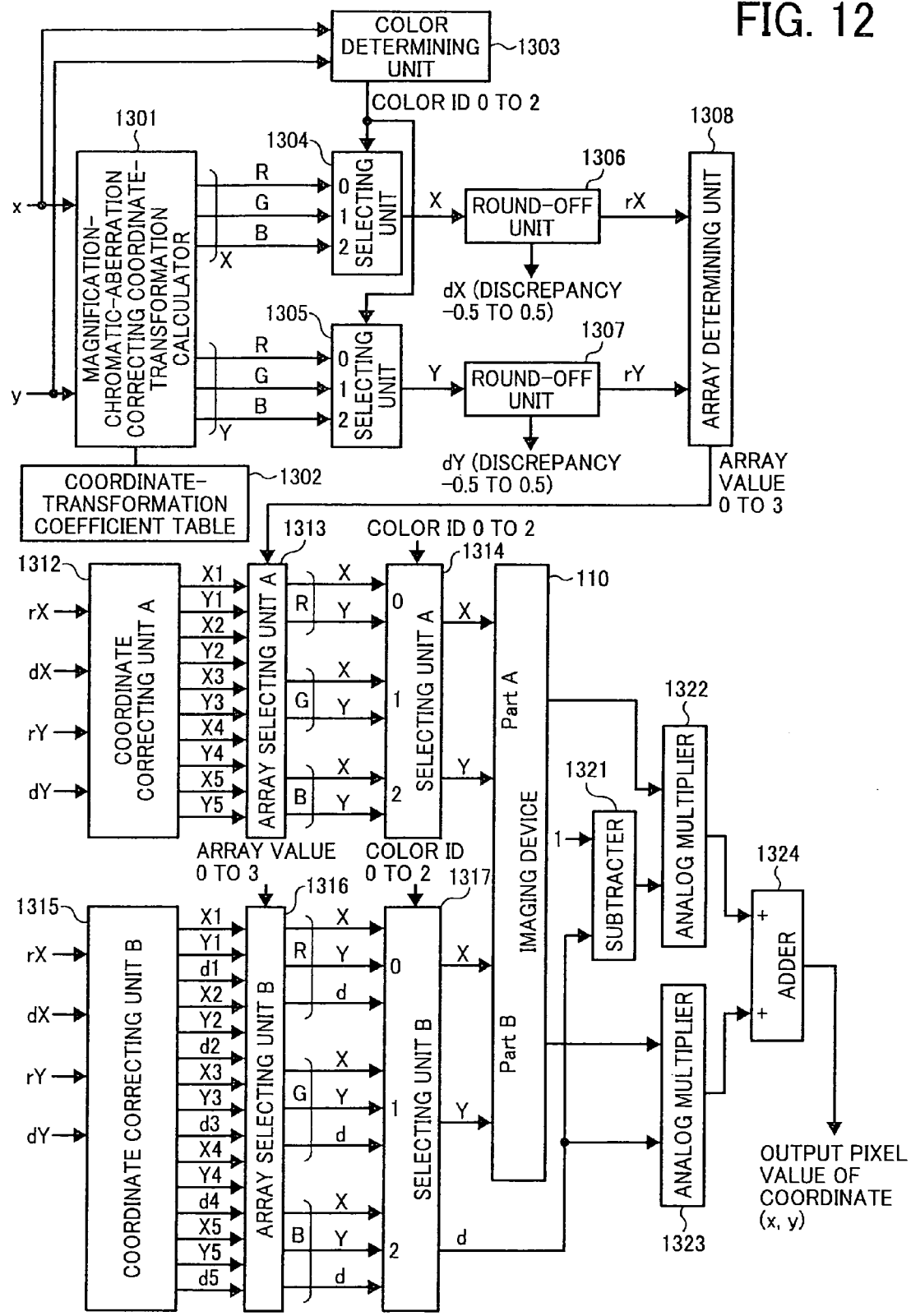
FIG. 12 is an overall configuration diagram of the coordinate transforming unit shown in FIG. 2 according to a second example of the present invention.
Figure 17:
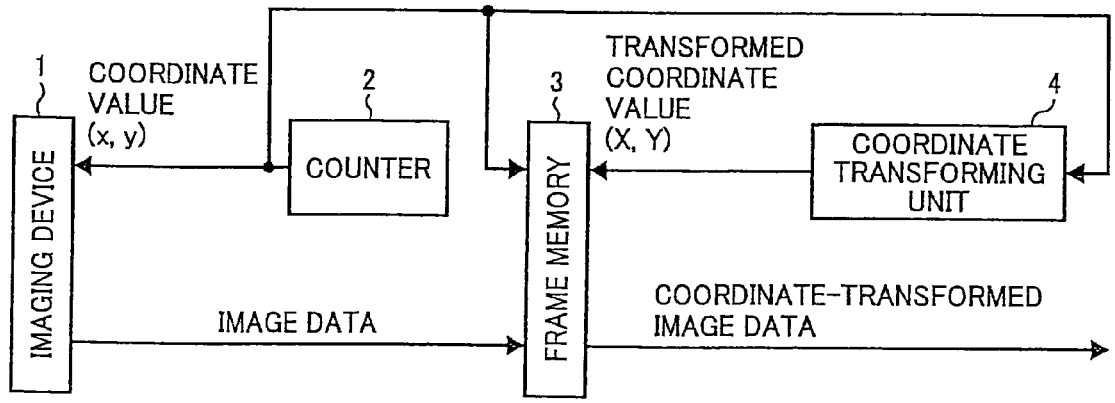
FIG. 17 is a configuration diagram of a conventional imaging apparatus.

FIG. 12 is an overall configuration diagram of the coordinate transforming unit 130 according to a second example. The same as in the first example applies to the second example, when the color of the coordinate of the source is the same as that of the destination. However, when the color is different from each other, two coordinates of the same color as that of the coordinate of the destination near the coordinate of the source are selected, and the pixel value of the pixel corresponding to the coordinate of the destination is interpolated based on the pixel values of the respective coordinates, and the interpolated pixel value is designated as the pixel value of the coordinate of the destination.

In FIG. 12, because the processing in the magnification-chromatic-aberration correcting coordinate-transform calculator 1301, the color determining unit 1303, the selecting units 1304 and 1305, the round-off units 1306 and 1307, and the array determining unit 1308 is the same as that shown in FIG. 7, explanations thereof will be omitted.

A coordinate correcting unit A 1312 and a coordinate correcting unit B 1315 respectively input rX, rY, dx, dy as in the coordinate correcting unit 1309 in FIG. 7, to calculate the coordinate value of the source after the correction for all types (patterns 1 to 5) that can be obtained for the array patterns of the same color in the Bayer array, that is, calculate the coordinate value of different coordinates such as left and right, above and below, or diagonal of the focused coordinate (dx, dy) of the source to be corrected. Simultaneously, the coordinate correcting unit B 1315 newly calculates a value d as well. As described later, d is used as a weighting coefficient at the time of performing interpolation with respect to the pixels of the two coordinates.

FIGS. 13A to 13E depict a content of calculation performed by the coordinate correcting unit A 1312. The patterns 1 to 5 in FIGS. 13A to 13E are the same as those in FIGS. 10A to 10E. In the second example, the coordinate correcting unit A 1312 receives rX, rY, dX, dY, performs calculation according to (a) to (e) written below the patterns 1 to 5 in FIGS. 12A to 12E, and outputs X1 and Y1, X2 and Y2, X3 and Y3, X4 and Y4, and X5 and Y5, respectively. In pattern 1, the coordinate (rX, rY) (central coordinate) of the source is designated as (X1, Y1) as it is. In pattern 2, the left coordinate of the coordinate (rX, rY) of the source is designated as (X2, Y2) In pattern 3, a coordinate immediately above the coordinate (rX, rY) is designated as (X3, Y3). In pattern 4, the left coordinate of the coordinate (rX, rY) is designated as (X4, Y4) as in pattern 2. A vertical direction is ignored here. In pattern 5, a coordinate at lower left or upper left of the coordinate (rX, rY) is designated as (X5, Y5) according to dY.

FIGS. 14A to 14E depict a content of calculation performed by the coordinate correcting unit B 1315. The coordinate correcting unit B 1315 receives rX, rY, dX, dY, performs calculation according to (a) to (e) written below the patterns 1 to 5 in FIGS. 14A to 14E, and outputs X1 and Y1, X2 and Y2, X3 and Y3, X4 and Y4, and X5 and Y5, respectively. The coordinate correcting unit B 1315 also outputs values d1, d2, d3, d4, and d5 simultaneously. In FIGS. 14A to 14E, pattern 1 is the same as that in FIG. 13A. Patterns 2 to 5 are different from those in FIGS. 13B to 13E. That is, in pattern 2, the right coordinate of the coordinate (rX, rY) (central coordinate) of the source is designated as (X2, Y2), and d2=dX×0.5 is also output. In pattern 3, a coordinate immediately below the coordinate (rX, rY) is designated as (X3, Y3), and d3=dY+0.5 is also output. In pattern 4, the right coordinate of the coordinate (rX, rY) is designated as (X4, Y4) as in pattern 2 (ignoring the vertical direction), and d4=dX+0.5 is also output. In pattern 5, a coordinate at lower right or upper right of the coordinate (rX, rY) is designated as (X5, Y5) according to dY, and d5=dX+0.5 is also output. As described later, weighting according to the distance equal to or less than one pixel is performed at the time of performing interpolation with respect to the pixels of the two coordinates, according to d1 to d5.

As described above, pattern 1 is applied to the case that the destination and the source are the same color, and patterns 2 to 5 are applied to the case that the destination and the source are different colors. Pattern 1 is applied to any colors of RGB. Patterns 2, 3, and 5 are applied to the case that the color of the source is R or B, and pattern 4 is applied to the case that the color of the source is G.

An array selecting unit A 1313 receives X1, Y1, X2, Y2, X3, Y3, X4, Y4, X5, Y5 output from the coordinate correcting unit A 1312 and selects a coordinate value X, Y of the source after correction of the respective colors of R, G, and B based on the array value obtained by the array determining unit 1308. A selecting unit A 1314 receives sets of X, Y of the respective colors of R, G, and B output from the array selecting unit A 1313, selects a set of X, Y of the same color as that of the destination based on the color ID obtained by the color determining unit 1303, and transmits the set to a line buffer 1320. The processing in the array selecting unit A 1313 and the selecting unit A 1314 is the same as that in the array selecting unit 1310 and the selecting unit 1311 in FIG. 7.

An array selecting unit B 1316 receives X1, Y1, d1, X2, Y2, d2, X3, Y3, d3, X4, Y4, d4, X5, Y5, d5 output from the coordinate correcting unit B 1315 and selects a coordinate value X, Y of the source after correction of the respective colors of R, G, and B, and a weighting coefficient d based on the array value obtained by the array determining unit 1308. The selecting unit B 1317 receives sets of X, Y, d of the respective colors of R, G, and B output from the array selecting unit B 1316, selects a set of X, Y, d of the same color as that of the destination based on the color ID obtained by the color determining unit 1303, and transmits the set of X, Y to the line buffer 1320, and the weighting coefficient d to a subtracter 1321 and an analog multiplier 1323. The processing in the array selecting unit B 1316 and the selecting unit B 1317 is the same as that in the array selecting unit 1310 and the selecting unit 1311 in FIG. 7; however, a point that the coefficient d is newly output is different.

In the present embodiment, the imaging device 110 has a 2-port configuration capable of random access. Pixel values of pixels of two different coordinates (X, Y) are read from the imaging device 110 as pixel values of pixels corresponding to the coordinate (x, y) based on the coordinate values (X, Y) output from the selecting units A 1314 and B 1317. As is understood from FIGS. 9, 13, and 14, the two different coordinates (X, Y) and the coordinate (x, y) are of the same color. In the case of the same color pattern 1, the two coordinates (X, Y) become the same coordinate (rX, rY).

The subtracter 1321 subtracts value d output from the selecting unit B 1317 together with the coordinate (X, Y) from 1. An analog multiplier 1322 multiplies the pixel value of the pixel at the coordinate (X, Y) read from the line buffer 1320 based on the coordinate value (X, Y) from the selecting unit A 1314 by the output value of the subtracter 1321. On the other hand, the analog multiplier 1323 multiplies the pixel value of the pixel at the coordinate (X, Y) read from the line buffer 1320 based on the coordinate value (X, Y) from the selecting unit B 1317 by the value d output from the selecting unit B 1317 together with the coordinate value (X, Y). An adder 1324 adds the output values from the analog multipliers 1322 and 1323 and designates the added value as the pixel value of the pixel at the coordinate (x, y). That is, the pixel value obtained by weighting the pixel values of pixels of two coordinates (X, Y) near the coordinate (rX, rY) of the source according to the weighting coefficient d and adding these pixel values is output from the adder 1324 as the pixel value of the coordinate of the destination. Because the coordinate (X, Y) and the coordinate (x, y) are maintained in the same color, the Bayer array does not change before and after the coordinate transform.

A specific example of the processing is explained with reference to FIGS. 6A and 6B. A case that the coordinate (x, y) of the destination is (0, 0) and the coordinate (rX, rY) of the source is (1, 1) is explained first. In this case, the selecting unit A 1314 outputs (1, 1) as (X, Y), and the selecting unit B 1317 also outputs (1, 1) as (X, Y), and d=0 simultaneously (halfway processing is omitted). Accordingly, the imaging device 110 reads the two pixel values of the pixel of the same coordinate (1, 1). Because d=0, an output from the subtracter 1321 is 1, and therefore the analog multiplier 1322 directly outputs the pixel value of the pixel at the coordinate (1, 1). The output of the subtracter 1321 is 0. Ultimately, the adder 1324 outputs the pixel value of the pixel at the coordinate (1, 1) as the pixel value of the pixel at the coordinate (0, 0).

A case that the coordinate (x, y) of the destination is (1, 0) and the coordinate (rX, rY) of the source is (3, 1) is explained next. In this case, the selecting unit A 1314 outputs (3, 0) as (X, Y) (halfway processing is omitted). The selecting unit B 1317 outputs (3, 2) as (X, Y), and d=0.7 (d3=dY+0.5, dY=0.2) simultaneously (halfway processing is omitted). Accordingly, the imaging device 110 reads a pixel value A of the pixel at the coordinate (3, 0) and a pixel value B of the pixel at the coordinate (3, 2), respectively. Because d=0.7, an output from the subtracter 1321 becomes 0.3, an output from the analog multiplier 1322 becomes 03×A, and an output from the analog multiplier 1323 becomes 0.7×B. The adder 1324 outputs a value obtained by adding the outputs from the analog multipliers 1322 and 1323. Thus, the adder 1324 outputs a pixel value obtained by weighting the pixel values of pixels of the two coordinates (X, Y) according to the weighting coefficient d and adding these pixel values as the pixel value of the pixel at the coordinate (x, y).

According to the configuration in FIG. 12, the 2-port configuration capable of random access is required for the imaging device 110. However, when the color of the coordinate of the source is different from that of the destination, the pixel value of the pixel corresponding to the coordinate of the destination is interpolated from the pixel values of the two coordinates of the same color as that of the coordinate of the destination near the coordinate of the source, thereby enabling to improve the image quality at the coordinate of the destination. Of course, the Bayer array is maintained before and after the coordinate transform.

A pixel value of a pixel corresponding to the coordinate of the destination can be interpolated from the pixel values of three or more coordinates of the same color as that of the coordinate of the destination near the coordinate of the source by extending the configuration of FIG. 12 (for example, pixel values of four pixels are interpolated). In this case, the image quality of the pixel of the destination can be further improved.

A third example is basically the same as the second example, however, when the color of the coordinate of the source is different from that of the destination, as the two coordinates of the same color as that of the coordinate of the destination near the coordinate of the source, the coordinates are unified to two coordinates in the same direction (x) as a reading direction of the imaging device 110. The overall configuration of the coordinate transforming unit 130 is the same as that shown in FIG. 12, and therefore explanations thereof will be omitted. The contents of calculation in the coordinate correcting unit A 1312 and the coordinate correcting unit B 1315 are partly different from those in the second example.

FIGS. 15A to 15E depict the content of calculation in the coordinate correcting unit A 1312, and FIGS. 16A to 16E depict the content of calculation in the coordinate correcting unit B 1315. In FIGS. 15A to 15E, only pattern 3 is different from FIGS. 13 and 14. That is, in patterns 1, 2, 4 and 5, the set of two coordinates (the same coordinate in pattern 1) in the same direction (x) as the reading direction of the imaging device 110 is selected both in FIGS. 13 and 14. In pattern 3, in FIGS. 13 and 14, the set of two coordinates in the y direction is selected. On the other hand, in the third example, as shown in FIGS. 15 and 16, in pattern 3, the same coordinate above or below the coordinate of the source is selected as the set of the two coordinates. The weighting coefficient d3 is set to be 0. Accordingly, interpolation is performed in the same manner as for pattern 1. Therefore, the set of two coordinates in the same direction (x) as the reading direction of the imaging device 110 can be selected in any case of patterns 1 to 5.

When the reading direction of the imaging device 110 is the y direction, the set of two coordinates in the y direction can be selected by changing the calculation contents of the coordinate correcting unit A 1312 and the coordinate correcting unit B 1315.

According to the third example, burst read in the imaging device can be easily performed, and random access can be reduced. Therefore, a low-cost and low-speed CMOS or the like can be used.

In FIG. 2, the coordinate transforming unit 130 can correct the magnification chromatic aberration and distortion at the same time. Accordingly, the distortion correcting unit 170 can be omitted, and the coordinate transform memory for correction of the distortion is not required. The configuration in which the magnification chromatic aberration and distortion are corrected at the same time is basically the same as the configuration shown in FIGS. 7 and 12, and the magnification chromatic-aberration correcting coordinate-transform calculator 1301 can be changed to a coordinate transform calculator for correcting the magnification chromatic aberration and distortion. In this calculator, a coordinate value (x, y) of the destination is input, and a coordinate value obtained by adding the distortion to the magnification chromatic aberration is calculated and output as the coordinate value X, Y of the source corresponding to RGB according to a predetermined formula of coordinate transform. The processing thereafter is basically the same as that explained in the first, second, and third examples.

According to one aspect of the present invention, the frame memory or line buffer for coordinate transform is not required, and image data of the coordinate-transformed color array is read directly from the imaging device.

Furthermore according to another aspect of the present invention, the imaging device can be made into one chip together with the coordinate transforming unit, thereby enabling to achieve downsizing and reduction in cost.

Moreover, according to still another aspect of the present invention, the color array of the image data can be maintained before and after coordinate transform.

Furthermore, according to still another aspect of the present invention, the color array of the image data can be maintained before and after coordinate transform, and the pixel quality at a coordinate transform destination is improved.

Moreover, according to still another aspect of the present invention, in an imaging apparatus that uses an imaging device including a color filter of a color array, image data for which coordinate transform such as correction of the magnification chromatic aberration or correction of distortion is performed in a state of a predetermined color array can be read directly from the imaging device, without having the frame memory or line buffer for coordinate transform separately, thereby enabling to reduce the cost of the entire apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An imaging apparatus, comprising:
   an imaging device including a color filter having a predetermined color array, the imaging device converting an optical image obtained through an optical system into image data of an electrical signal; and
   a coordinate transforming unit that performs a coordinate transform of transforming a first coordinate value of the imaging device into a second coordinate value in a state of the color array according to a color of the color filter corresponding to the first coordinate value;

wherein the imaging device reads out a pixel value of a pixel at the second coordinate value as a pixel value of a pixel at the first coordinate value taking the first coordinate value as a coordinate transform destination and the second coordinate value as a coordinate transform source, and wherein the coordinate transforming unit performs the coordinate transform so that the imaging device reads out each pixel in the image data of the color array by setting a pixel value of a pixel of the coordinate transform source as a pixel value of a pixel of the coordinate transform destination when a color of the color array of the coordinate transform source is the same as that of the coordinate transform destination and setting a pixel value of a pixel at a coordinate value of a same color as that of the coordinate transform destination closest to the coordinate transform source as the pixel value of the pixel of the coordinate transform destination when the color of the color array of the coordinate transform source is different from that of the coordinate transform destination.

2. The imaging apparatus according to claim 1, wherein the imaging device includes a random access mechanism.

3. The imaging apparatus according to claim 1, wherein the coordinate transforming unit is built in the imaging device.

4. The imaging apparatus according to claim 1, wherein the coordinate transforming unit performs the coordinate transform for correcting at least one of magnification chromatic aberration and distortion of the image data.

5. An imaging apparatus, comprising:
an imaging device including a color filter having a predetermined color array, the imaging device converting an optical image obtained through an optical system into image data of an electrical signal; and
a coordinate transforming unit that performs a coordinate transform of transforming a first coordinate value of the imaging device into a second coordinate value in a state of the color array according to a color of the color filter corresponding to the first coordinate value;
wherein the imaging device reads out a pixel value of a pixel at the second coordinate value as a pixel value of a pixel at the first coordinate value taking the first coordinate value as a coordinate transform destination and the second coordinate value as a coordinate transform source, and
wherein the coordinate transforming unit performs the coordinate transform so that the imaging device reads out a pixel value of a pixel of the coordinate transform source as a pixel value of a pixel of the coordinate transform destination when a color of the color array of the coordinate transform source is the same as that of the coordinate transform destination and reads out pixel values of pixels at a plurality of coordinate values of a same color as that of the coordinate transform destination near the coordinate transform source as the pixel value of the pixel of the coordinate transform destination when the color of the color array of the coordinate transform source is different from that of the coordinate transform destination.

6. The imaging apparatus according to claim 5, wherein a number of the coordinate values of the same color as that of the coordinate transform destination near the coordinate transform source is two.

7. The imaging apparatus according to claim 6, wherein two coordinate values of the same color as that of the coordinate transform destination near the coordinate transform source correspond to coordinates in a same direction as a reading direction of the imaging device.

8. The imaging apparatus according to claim 1, further comprising:
a compensating unit that compensates a defective pixel due to the color array for coordinate-transformed image data of the color array.

9. The imaging apparatus according to claim 8, further comprising:
a distortion correcting unit that corrects distortion of image data obtained by compensating the defective pixel due to the color array in magnification chromatic aberration-corrected image data in a subsequent stage of the compensating unit.

10. The imaging apparatus according to claim 5, wherein the imaging device includes a random access mechanism.

11. The imaging apparatus according to claim 5, wherein the coordinate transforming unit is built in the imaging device.

12. The imaging apparatus according to claim 5, wherein the coordinate transforming unit performs the coordinate transform for correcting at least one of magnification chromatic aberration and distortion of the image data.

13. The imaging apparatus according to claim 5, further comprising:
a compensating unit that compensates a defective pixel due to the color array for coordinate-transformed image data of the color array.

14. The imaging apparatus according to claim 13, further comprising:
a distortion correcting unit that corrects distortion of image data obtained by compensating the defective pixel due to the color array in magnification chromatic aberration-corrected image data in a subsequent stage of the compensating unit.

15. The imaging apparatus according to claim 5, wherein the imaging apparatus further comprises a correcting unit that compensates the pixel value of the pixel corresponding to the coordinate transform destination from the pixel values of the pixels of the plurality of coordinate values of the same color as that of the coordinate transform destination near the coordinate transform source, and sets an obtained pixel value as the pixel value of the pixel of the coordinate transform destination.

16. The imaging apparatus according to claim 15, wherein a number of the coordinate values of the same color as that of the coordinate transform destination near the coordinate transform source is two.

17. The imaging apparatus according to claim 16, wherein two coordinate values of the same color as that of the coordinate transform destination near the coordinate transform source correspond to coordinates in a same direction as a reading direction of the imaging device.

* * * * *